United States Patent
Nguyen et al.

(10) Patent No.: US 10,974,984 B2
(45) Date of Patent: Apr. 13, 2021

(54) MANUFACTURING PROCESS FOR STRIAE-FREE MULTICOMPONENT CHALCOGENIDE GLASSES VIA CONVECTION MIXING

(71) Applicant: The Government of the United States of America, as represented by the Secretary of the Navy, Arlington, VA (US)

(72) Inventors: Vinh Q. Nguyen, Fairfax, VA (US); Jasbinder S. Sanghera, Ashburn, VA (US); Daniel J. Gibson, Falls Church, VA (US); Mikhail Kotov, Silver Spring, MD (US); Gryphon A. Drake, Potomac, MD (US); Shyam S. Bayya, Ashburn, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 210 days.

(21) Appl. No.: 16/226,871

(22) Filed: Dec. 20, 2018

(65) Prior Publication Data

US 2019/0194052 A1 Jun. 27, 2019

Related U.S. Application Data

(60) Provisional application No. 62/609,559, filed on Dec. 22, 2017.

(51) Int. Cl.
*C03B 5/235* (2006.01)
*B32B 17/00* (2006.01)
(Continued)

(52) U.S. Cl.
CPC .............. *C03B 5/235* (2013.01); *B32B 17/00* (2013.01); *C03B 5/06* (2013.01); *C03C 1/00* (2013.01); *C03B 2201/86* (2013.01)

(58) Field of Classification Search
CPC ....................................................... C03B 5/235
See application file for complete search history.

(56) References Cited

U.S. PATENT DOCUMENTS

| 3,834,883 A | * | 9/1974 | Klein | ...................... C03C 3/323 65/32.2 |
| 2003/0192350 A1 | * | 10/2003 | Uhlenbrock | ............ C03C 3/321 65/83 |

(Continued)

*Primary Examiner* — Cynthia Szewczyk
(74) *Attorney, Agent, or Firm* — US Naval Research Laboratory; Rebecca Forman

(57) ABSTRACT

A method for making high optical quality multicomponent chalcogenide glasses without refractive index perturbations due to striae, phase separation or crystal formation using a sealed ampoule with chemical components enclosed inside, a two-zone furnace, a convection heating/mixing step, and multiple fining steps. Initially, the sealed ampoule is oriented vertically within the two-zone furnace and heated to melt the chemical components contained within, and a temperature gradient is created between the top zone and the bottom zone such that the bottom zone has a higher temperature. This temperature gradient causes convection currents within the viscous liquid until it is sufficiently mixed due to the convective flow. Then the temperature gradient is reversed such that the top zone now has a higher temperature and the convective flow ceases. The furnace temperatures are then reduced over a period of time, with holds at multiple temperatures for fining and cooling to form a solid glass.

6 Claims, 14 Drawing Sheets

(51) Int. Cl.
 *C03B 5/06* (2006.01)
 *C03C 1/00* (2006.01)

(56) References Cited

U.S. PATENT DOCUMENTS

| | | | |
|---|---|---|---|
| 2010/0022378 A1* | 1/2010 | Nguyen | C03B 5/2252 501/40 |
| 2015/0344342 A1* | 12/2015 | Nguyen | C03B 5/06 501/40 |
| 2016/0257593 A1* | 9/2016 | Nguyen | C03B 1/00 |

* cited by examiner

MANUFACTURING PROCESS FOR STRIAE-FREE MULTICOMPONENT CHALCOGENIDE GLASSES VIA CONVECTION MIXING

PRIORITY CLAIM

The present application is a non-provisional application claiming the benefit of U.S. Provisional Application No. 62/609,559, filed on Dec. 22, 2017 by Vinh Q. Nguyen et al., entitled "STRIA-FREE MULTICOMPONENT CHALCOGENIDE GLASSES VIA CONVECTION MIXING." The entire contents of this provisional application and all references cited within the present application are incorporated herein by reference.

BACKGROUND OF THE INVENTION

Field of the Invention

The present invention relates to making striae-free multicomponent chalcogenide glasses with uniform refractive index using convection mixing.

Description of the Prior Art

Chalcogenide glasses comprise at least one chalcogen element (S, Se or Te) and other elements including, but not limited to, Ge, As, Ga, Sn, Sb and transmit infrared light (IR) from between about 1 µm, or lower, to about 12 µm or greater, depending on composition. The infrared transmitting chalcogenide glasses and optical fibers encompass the IR region of interest with numerous applications including thermal imaging, temperature monitoring, and medical applications. Also, chalcogenide glass fibers may be used for IR missile warning systems and laser threat warning systems to provide superior aircraft survivability, and high energy IR power delivery using for example, but not limited to, CO (5.4 µm) and $CO_2$ (10.6 µm) lasers (Sanghera et al., "IR fiber optics development at the naval Research Laboratory," SPIE, 3950, 180-185 (2000) and Sanghera et al., "Applications of Chalcogenide Glass Optical Fibers at NRL," J. Optoelectronics and Advanced Materials, 3, No. 3, 627-640 (2001)). In addition, these fibers may be used for remote fiber optic chemical sensor systems for military facility clean-up and other industrial applications. High quality infrared transmitting optical fibers enable applications in remote chemical sensors to detect contaminants in groundwater, environmental pollution monitoring, Raman amplifiers, optical ultra-fast switches for telecommunications, fiber sources in the infrared for sensors, biomedical surgery and tissue diagnostics, and other civil/industrial process monitoring applications. Chalcogenide glasses may also be used as bulk optical elements, including windows, lenses, prisms, beam splitters and the like, and must have high compositional uniformity and homogeneity in order to maintain accurate control of light rays passing through the glass and to achieve satisfactory optical results.

The properties of the chalcogenide-based glasses, including optical, physical and thermal properties, such as refractive index, dispersion, thermo-optic coefficient, glass transition temperature, viscosity profile, hardness, fracture toughness, thermal expansion, density, nonlinear index, fluorescence, wavelengths of transmission and others, can be tailored through composition. However, some chalcogenide glass compositions with technologically useful properties may be thermodynamically unstable whereby crystallites or other inhomogeneities, including phase-separated glassy regions or devitrified regions, form within the glass during synthesis, melting or processing. These inhomogeneities can manifest as striae, cords, bands, veins, inclusions, bubbles, areas of stress birefeingence and others ("TIE-25: Striae in optical glass," Technical Information Sheet, Optics for Devices, Schott A G, (2006) http://www.us.schott.com/advanced_optics/english/knowledge-center/technical-articles-and-tools/tie.html). When synthesized using the methods of prior art, this thermodynamic instability limits the physical size of the glass that may be fabricated (such as $Ge_{30}As_{22}Se_{23}Te_{25}$), and in some cases optical quality glass may not be made in any size due to crystal formation (such as $Ge_{13}As_{32}Se_{25}Te_{30}$) (Kokorina, Glasses for Infrared Optics, CRC Press, Inc. (1996)). It is well-known in the art of glass making that thermodynamically unstable glasses can be synthesized by rapidly cooling the melt, but the glasses are not optical quality due to striations that form upon rapid cooling.

It is well-known in the art of glass making that chemical species may evaporate or sublime from the surface of a glass melt at temperature resulting in a compositional inhomogeneity or depletion layer near the surface of the glass melt. For this reason, it is common to remove and discard the glass near the top surface of a boule when optical homogeneity is desired. This problem is especially prevalent in chalcogenide glasses where the vapor pressures of the constituent elements can be quite high at the glass melting temperature, as shown graphically in FIG. 1 for sulfur 80, selenium 81, arsenic 82, tellurium 83, and germanium 84, and the depletion layer may be very thick if pressure is not controlled. For this reason, it is common practice to synthesize chalcogenide glasses inside of sealed containers, such as a quartz or silica glass ampoule, that has been evacuated or purged with an inert gas, such as nitrogen, argon, or similar. Additionally, an inert crucible can be placed inside the silica ampoule to prevent contact of the melt with the ampoule if there is a detrimental interaction or chemical reaction between them. Examples of inert materials include vitreous carbon, graphite, and other suitable materials. The sealed vessel contains the gaseous chemical elements under positive pressure and prevents excessive evaporation. A common practice in the synthesis and melting of chalcogenide glasses is to rock, invert, shake gently, or otherwise agitate the ampoule and the liquefied glass melt contained within in order to thoroughly mix or homogenize the glass melt. As the homogenized glass melt is subsequently cooled, chemicals in the vapor phase above the melt must condense as the equilibrium partial pressure decreases, and it is common that the resulting condensate deposits on the surface of the glass melt. This condensate can be of varying chemical composition, dictated by the specific vapor pressure-temperature curves of the elements, resulting in a compositional inhomogeneity near the surface of the glass melt. It is common practice to remove and discard the top surface of the glass boule to remove condensation and the depletion layer. For some glass compositions, however, the glass melt may be very fluid at the melt temperature, and either the condensate, the depletion layer, or both may percolate deeper within the glass boule as it solidifies carrying with it inhomogeneity in the form of striae or cord due to variations in chemical composition. This is especially true for glasses with multiple chemical components or with multiple stable phases. An annealing step, heating the glass for an extended period at a temperature near the glass transition temperature, is typically performed to alleviate stress in the glass, which can be another source of strain-induced optical inhomogeneity or stress birefringence. It is well understood however that the viscosity of the glass is sufficiently high during annealing that compositional inhomogeneity cannot be removed by annealing. Such glasses are difficult or impossible to fabricate with high homogeneity using the prior art methods.

BRIEF SUMMARY OF THE INVENTION

The aforementioned problems are overcome in the present invention which provides a method for synthesizing high optical quality multicomponent chalcogenide glasses without refractive index perturbations due to striae, phase separation or crystal formation using a sealed ampoule with chemical components enclosed inside, a two-zone furnace, a convection heating/mixing step, and multiple fining steps. Initially, the sealed ampoule is oriented vertically within the two-zone furnace and heated to melt the chemical components contained within, and a temperature gradient (in the vertical direction) is created between the top zone and the bottom zone such that the bottom zone has a higher temperature. This temperature gradient causes convection currents within the viscous liquid until it is sufficiently mixed due to the convective flow. Then the temperature gradient is reversed such that the top zone now has a higher temperature and the convective flow ceases. The furnace temperatures are then reduced over a period of time, with holds at multiple temperatures for fining (removal of bubbles) and cooling to form a solid glass.

The present invention provides a method for the synthesis of high-purity chalcogenide glasses with excellent clarity and no apparent optical inhomogeneity or striae without the need for mechanical agitation, stirring or rocking. The glasses of this invention may be used for infrared optical elements, lenses, windows and infrared optical fibers.

The present invention enables synthesis of homogeneous, optical quality glasses for some glass compositions that are not possible using methods of the prior art. The chalcogenide glasses and fibers described herein, and more specifically glasses and fibers containing primarily arsenic, sulfur, selenium, tellurium, and germanium with dopants including antimony, gallium aluminum, indium, bismuth, tin, iodine, bromine, chlorine, fluorine, lanthanum, and other elements up to about 10% atomic each, may be synthesized according to the method of the present invention in forms suitable for optical quality fibers and geometric optics including windows, lenses and other devices.

The process of the present invention has the following advantages over the processes of the prior art:

Glass melt homogenization is not derived from external mechanical agitation or rocking as is done in the prior art, but from convective flow within the glass melt and a evaporation-reflux cycle near the surface of the glass melt, established by a negative temperature gradient (bottom hotter than the top) within the two-zone furnace.

No mechanism of rocking is required in the furnace resulting in more economical and more durable processing facilities for lower cost glass.

Glass is uniform optical quality and free of striae or inclusions. This enables reliable manufacture of high-performance IR fibers and refractive optical elements.

Glass synthesis cycle times can be greatly reduced by the present invention.

These and other features and advantages of the invention, as well as the invention itself, will become better understood by reference to the following detailed description, appended claims, and accompanying drawings.

BRIEF DESCRIPTION OF THE DRAWINGS

FIG. 14A shows a human hand viewed through $As_{39}Se_{61}$ glass of the present invention. FIG. 14B shows a human hand viewed through $As_{39}Se_{61}$ glass of the prior art.

DETAILED DESCRIPTION OF THE INVENTION

The present invention provides a method for synthesizing high optical quality multicomponent chalcogenide glasses without refractive index perturbations due to striae, phase separation or crystal formation. The method uses a sealed ampoule (typically a quartz or silica ampoule) with chemical components enclosed inside, a two-zone furnace, a convection heating/mixing step, and multiple fining steps. Initially, the sealed ampoule is oriented vertically within the two-zone furnace and heated to melt the chemical components contained within, and a temperature gradient (in the vertical direction) is created between the top zone and the bottom zone such that the bottom zone has a higher temperature. This temperature gradient causes convection currents within the viscous liquid until it is sufficiently mixed due to the convective flow. Then the temperature gradient is reversed such that the top zone now has a higher temperature and the convective flow ceases. The furnace temperatures are then reduced over a period of time, with holds at multiple temperatures for fining (removal of bubbles) and cooling to form a solid glass.

Figure 1:
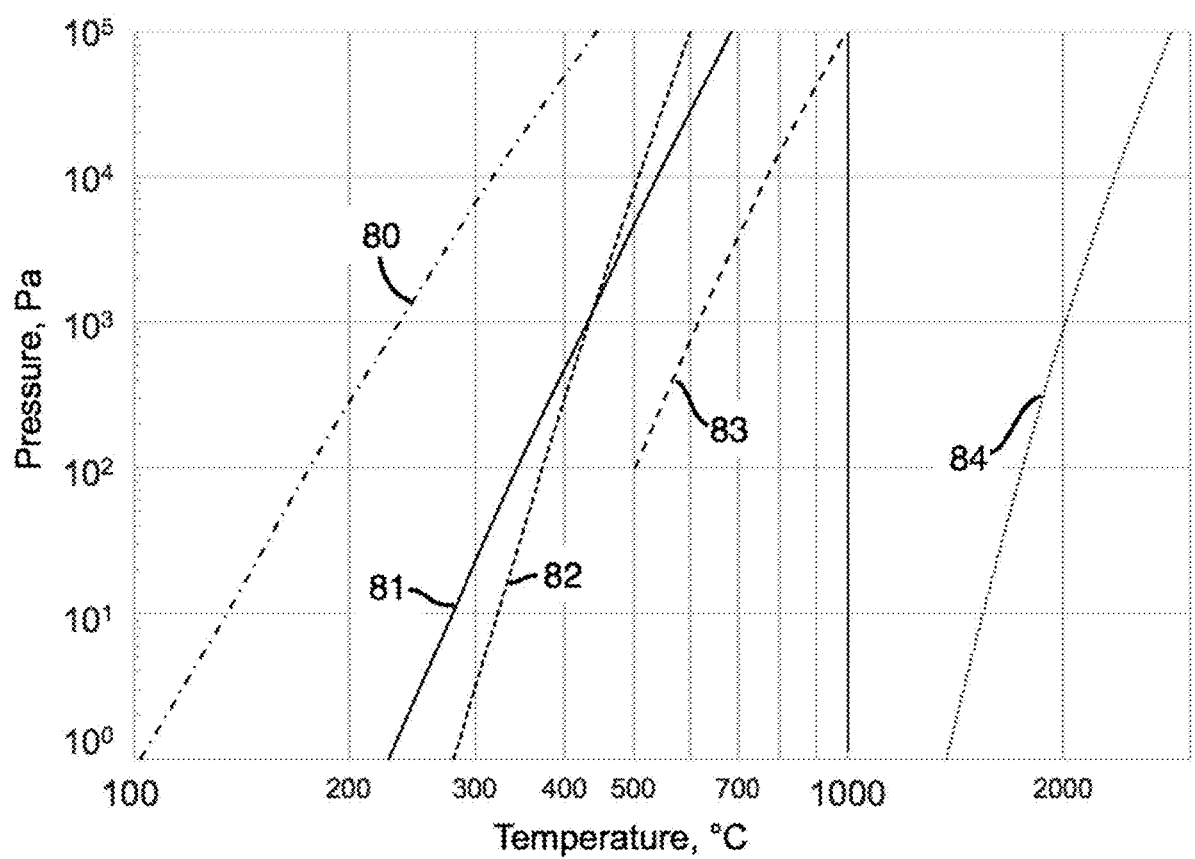
FIG. 1 shows vapor pressure (in Pascal, Pa.) curves of five elements commonly used in the production of chalcogenide glasses for infrared applications: sulfur, selenium, arsenic, tellurium, and germanium as a function of temperature in degrees centigrade (° C.).

FIG. 1 shows vapor pressure (in Pascal, Pa.) curves of five elements commonly used in the production of chalcogenide glasses for infrared applications: sulfur 80, selenium 81, arsenic 82, tellurium 83, and germanium 84 as a function of temperature in degrees centigrade (° C.). The curves are plotted in logarithmic scale on both axes.

Figure 2:
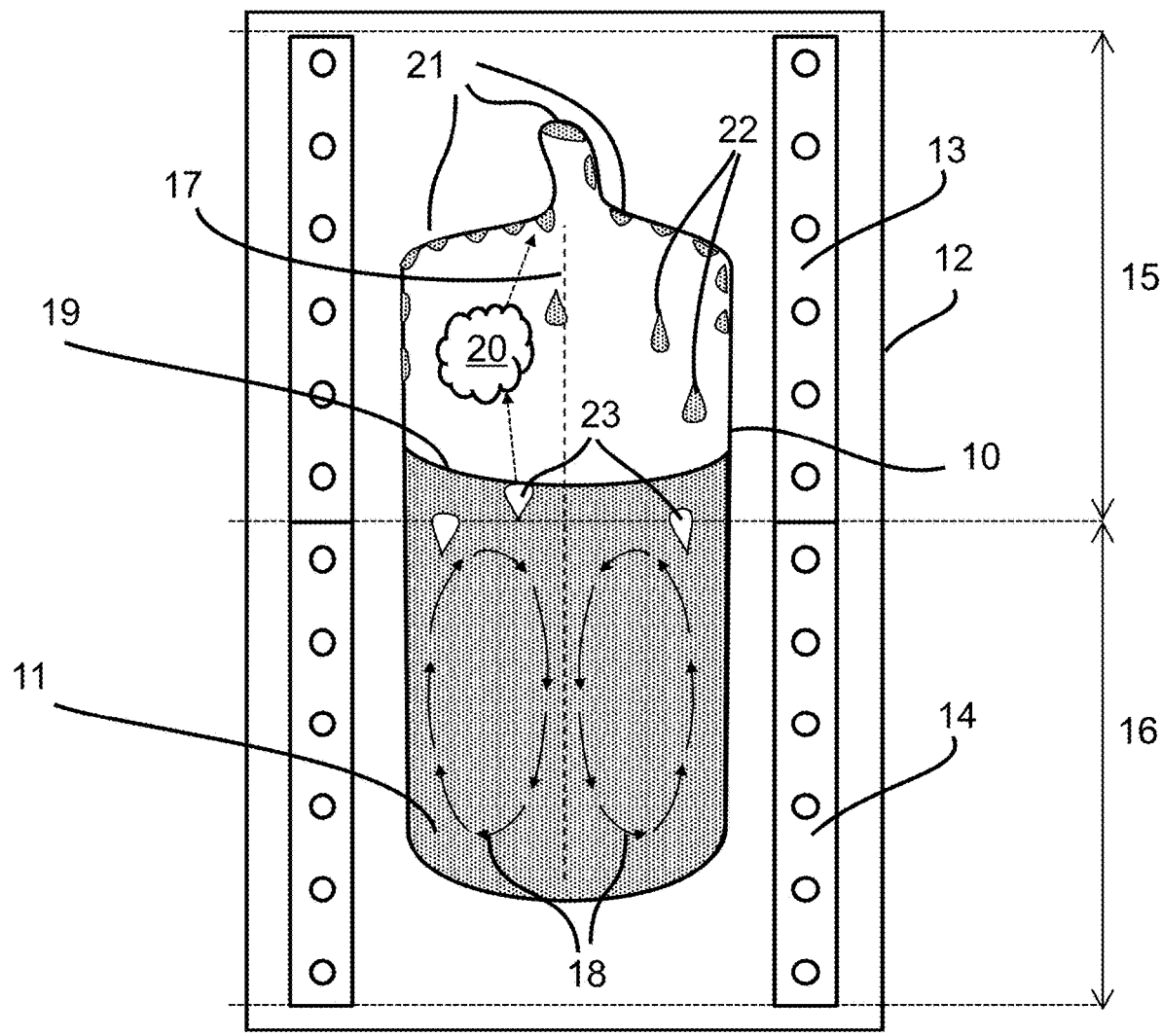
FIG. 2 is a schematic overview of the glass melting and homogenization step of the process to synthesize infrared glasses by melt processing using the present invention, specifically without mechanical agitation. A sealed ampoule containing a glass melt is inside a vertical furnace having two independently controllable heaters with the top zone set to a temperature about 350° C. lower than that of the bottom zone to provide a negative temperature gradient. Convection currents and evaporation-condensation provide a means of mixing the melt.

The glass melting and homogenization step of the process to synthesize infrared glasses by melt processing using the present invention without mechanical agitation is shown schematically in FIG. 2. As shown in FIG. 2, a sealed ampoule 10 containing a glass melt 11 is placed inside a furnace 12 having two separate heating elements, specifically a top, or upper, heating element 13 and a bottom, or lower, heating element 14. These heating elements are controlled separately such that they provide two distinct temperature zones within the furnace, a top, or upper, zone 15 and a bottom, or lower, zone 16. The furnace and ampoule are oriented such that their common central axis 17 is approximately vertical and stationary. During the homogenization or mixing step of the present invention, the bottom zone is heated to be significantly hotter than the top zone, in the example presented here, the temperature difference between the two zones is about 350° C. The temperature gradient imparts a convective flow 18 within the glass melt 11 that acts to mix the glass melt 11. Chemical elements leave the surface of the glass melt 19, and enter the vapor phase 20 above the glass melt 11. Liquid droplets 21 containing the glass constituents condense on the upper portion of the ampoule 10 and may fall as condensation droplets 22 back into the glass melt 11 where they are reincorporated therein. Bubbles 23 may form within the glass melt 11 or at the ampoule-glass melt interface and migrate through the glass melt 11 to the surface 19. The migration of bubbles 23 through the glass melt 11 can be vigorous and provide significant mixing and agitation to the glass melt 11 without external mechanical agitation, for example rocking, inversion or shaking of the furnace 12, the ampoule 10, or both.

This invention has been demonstrated using $As_{39}Se_{61}$ glasses in the examples but can also be applied to other two-component and multi-component chalcogenide glasses such as but not limited to arsenic, sulfur, selenium and tellurium based glasses and other multi-component chalcogenide and chalcohalide glasses containing germanium, antimony, gallium aluminum, indium, bismuth, tin, iodine, bromine, chlorine, fluorine, lanthanum, and other elements. The present invention could also be applied to the fabrication of other glasses (for example silicates, borates, fluorides, phosphates, and others) or processing of viscous liquids (for example polymer melts, metals, salts, and other liquids) where homogeneity is desired.

Example 1: Process of the Present Invention to Make Striae-Free and Crystallite-Free $As_xSe_y$ Glass Without Mechanical Rocking or Stirring of the Glass Melt The process of the present invention to make striae-free and crystallite-free $As_xSe_y$ glass (where x and y are atomic percentages and x+y=100) without mechanical rocking or stirring of the glass melt is shown in FIG. 2, and the steps are detailed in Table 1 and demonstrated here by example as the fabrication of a chalcogenide glass comprising 39% atomic As and 61% atomic Se and having no observable optical inhomogeneity or striae. A total of 800 grams of elemental chemicals, arsenic and selenium, were loaded inside a quartz-silica ampoule 10 under an inert nitrogen gas atmosphere. The ampoule was connected to a vacuum pump, evacuated, sealed, and placed inside a fixed vertical cylindrical bore, or tube, furnace 12 having an upper furnace element 13 and a lower furnace element 14 respectively corresponding to a top heat zone 15 and a bottom heat zone 16, and where each furnace zone was heated according to a glass melting schedule, an example of which is shown for $As_{39}Se_{61}$ glass in Table 1. The furnace in this example is fixed in a vertical position throughout the process, with no rocking or external mechanical agitation.

TABLE 1

Glass melting schedule for an As39Se61 glass composition in a two-zone furnace using the present invention with a second furnace for annealing.

| Step | Heating Rate (° C./min) | Temperature (° C.) Top Zone | Temperature (° C.) Bottom Zone | Dwell (Hours) |
|---|---|---|---|---|
| 1 | +2 | 450 | 800 | 24 |
| 2 | +0.6(T), −0.6(B) | 750 | 650 | 5 |
| 3 | −0.6 | 650 | 550 | 5 |
| 4 | −0.6 | 550 | 450 | 5 |
| 5 | −0.6 | 450 | 350 | 5 |
| 6 | −0.6 | 350 | 250 | 5 |
| 7 | −0.6 | 250 | 150 | 5 |
| 8 | Remove ampoule from furnace and quench in 25° C. water | | | |
| 9 | | 165 | 165 | 10 |

In Step 1, shown schematically in FIG. 2, the bottom zone 16 and top zone 15 of the furnace 12 were heated at a rate of +2° C./min from 20° C. (room temperature) to 800° C. and 450° C., respectively, to establish a negative temperature gradient (wherein the bottom of the furnace is hotter than the top), and these temperatures were held for 24 hours. During this step, the chemical constituents, As and Se, were heated to form a glass melt 11, and the large temperature gradient (350° C.) caused significant convective currents 18 within the glass melt 11. There was also a high rate of vaporization of chemicals from the surface of the glass melt 19 into the vapor phase 20 in the space above the melt, and bubbles 23 formed deep within the glass melt and traveled to the surface 19 adding to the gas phase material above the melt. This gas-phase material contacted the upper surface of the ampoule where it cooled and condensed forming droplets 21 on the ampoule 10 that subsequently dropped or refluxed 22 falling back into the glass melt 11. These ongoing processes, especially the boil-reflux cycle, were quite vigorous and provided mixing of the glass melt without external mechanical agitation as is required in the prior art. As shown in FIG. 1, the equilibrium vapor pressures of selenium 81 and arsenic 82 are significantly higher at 800° C., the temperature of the glass melt, than they are at 450° C., the temperature of the top of the ampoule, supporting the continuous evaporation-reflux cycle during this step.

Figure 3:
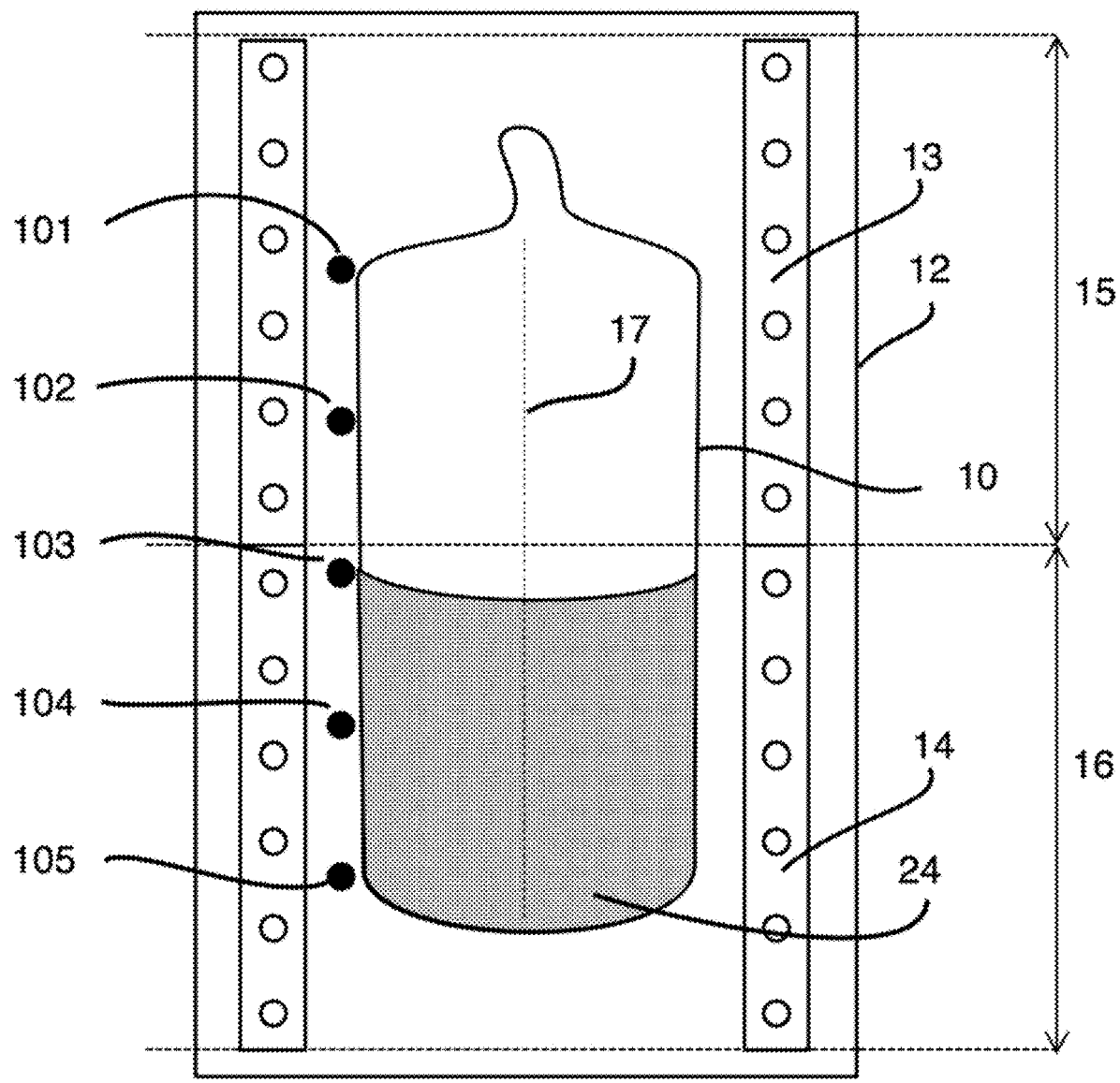
FIG. 3 is a schematic overview of the fining and cooling steps of the present invention. A sealed ampoule containing a well-mixed, homogenized glass melt is inside a two-zone furnace oriented so as to have a common vertical central axis. The temperature profile is measured using thermocouples along the length of the ampoule. The upper heater was set to a temperature about 100° C. higher than that of the lower heater to ensure a positive temperature gradient.

Steps 2-7 are shown schematically in FIG. 3, which is a schematic overview of the glass fining and cooling steps of the process to synthesize infrared glasses by melt processing using the present invention. A sealed ampoule 10 containing a well-mixed, homogenized glass melt 24 is vertically oriented inside a furnace 12 having two separate heating elements, specifically a top, or upper, heating element 13 and a bottom, or lower, heating element 14. These heating elements are controlled separately such that they provide two distinct temperature zones within the furnace, a top, or upper, zone 15 and a bottom, or lower, zone 16. The furnace 12 and ampoule 10 are oriented such that their common central axis 17 is approximately vertical and stationary. Thermocouples 101, 102, 103, 104, 105 are affixed to the ampoule 10 at five different positions to monitor the temperature of the ampoule 10 during the process. After the mixing step, the temperature gradient is reversed such that the top zone is hotter than the bottom zone to eliminate the convective currents and stop mixing of the glass.

Step 2 serves to stop the homogenization process and start the fining, or bubble removal process in preparation for cooling and solidification. In Step 2, the top zone 15 of the furnace was heated at a rate of +0.6° C./min to 750° C. The bottom zone 16 was cooled at a rate of −0.6° C./min to 650° C. to establish the positive temperature gradient of 100° C. between the top and bottom zones. Because the temperature gradient is now inverted from the prior step, the convective current slows and eventually stops when thermal equilibrium is reached. Also, the equilibrium vapor pressures of arsenic 82 and selenium 81 (see FIG. 1) are now lower in the glass melt, 650° C., than near the top of the ampoule, 750° C.; and condensation at the top of the ampoule stops, ending the vigorous evaporation/condensation cycle. This effectively stops the mixing/homogenization process of Step 1 within the now well-mixed homogeneous glass melt 24. Both zones were held for 5 hours to enable fining or settling and removal of bubbles within the well-mixed homogeneous melt 24.

Steps 3-7 serve to cool the glass melt slowly, while maintaining a positive temperature gradient (where the top is hotter than the bottom) to prevent unwanted convective currents. Slow cooling minimizes the rate of condensation at the top of the ampoule.

In Step 3, the top zone and bottom zone were cooled at a rate of −0.6° C./min to 650° C. and 550° C., respectively, and held for 5 hours while maintaining a temperature gradient of 100° C. between the top and bottom zones.

In Step 4, the top zone and bottom zone were cooled at a rate of −0.6° C./min to 550° C. and 450° C., respectively, and held for 5 hours while maintaining a temperature gradient of 100° C. between the top and bottom zones.

In Step 5, the top zone and bottom zone were cooled at a rate of −0.6° C./min to 450° C. and 350° C., respectively, and held for 5 hours while maintaining a temperature gradient of 100° C. between the top and bottom zones.

In Step 6, the top zone and bottom zone were cooled at a rate of −0.6° C./min to 350° C. and 250° C., respectively, and held for 5 hours while maintaining a temperature gradient of 100° C. between the top and bottom zones.

In Step 7, the top zone and bottom zone were cooled at a rate of −0.6° C./min to 250° C. and 150° C., respectively, and held for 0.5 hours while maintaining a temperature gradient of 100° C. between the top and bottom zones. The temperature profile of the ampoule during the dwell portion of Step 7 was measured with thermocouples 101, 102, 103, 104, 105 (FIG. 3) and is reported in Table 2.

TABLE 2

| Ampoule temperature profile during Step 7 | |
|---|---|
| Measurement point (See FIG. 3) | Temperature |
| 101 | 251° C. |
| 102 | 250° C. |
| 103 | 152° C. |
| 104 | 151° C. |
| 105 | 150° C. |

Figure 4:
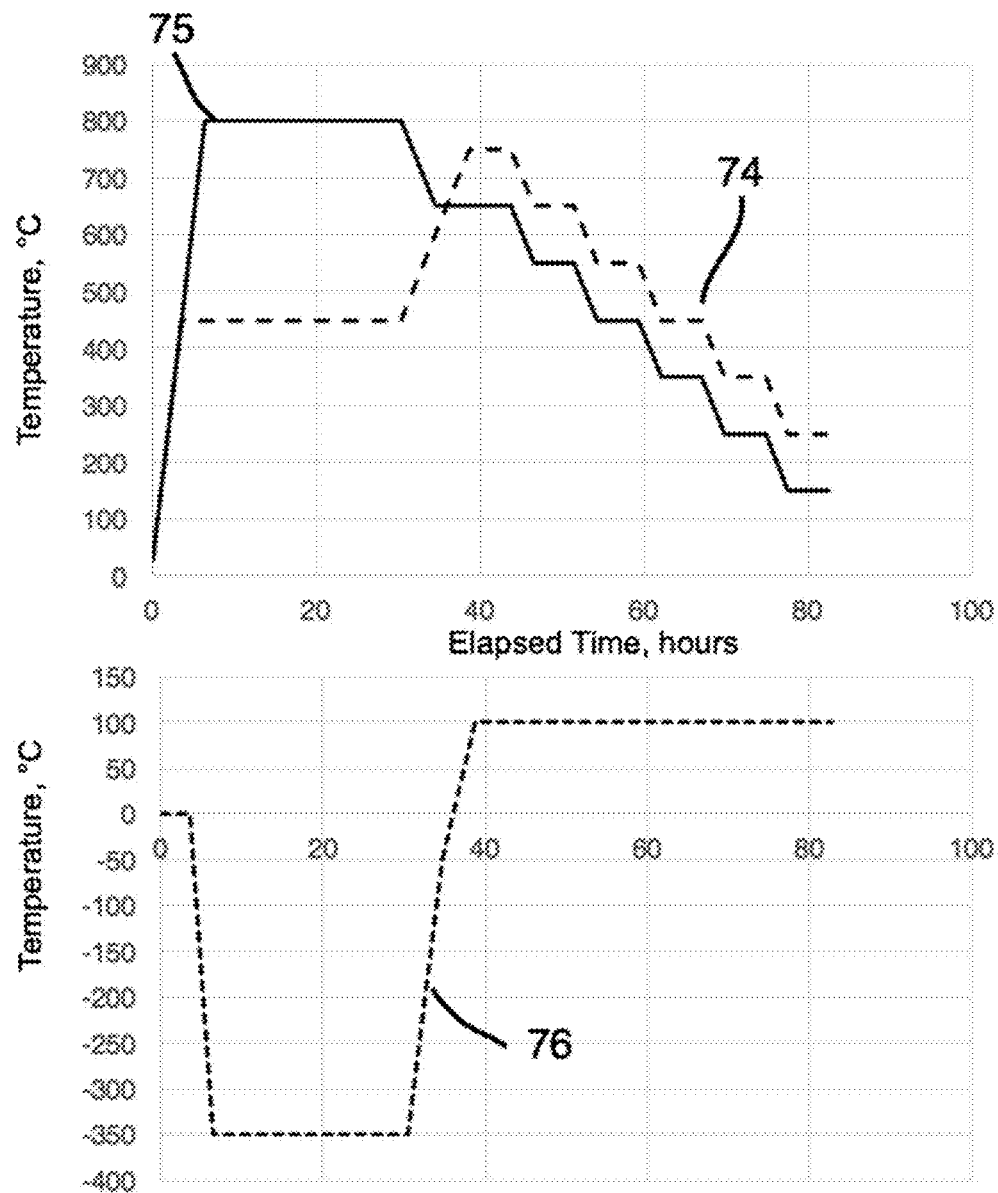
FIG. 4 shows temperature profiles of the furnace top zone, furnace bottom zone, and the temperature gradient during the synthesis of $As_{39}Se_{61}$ glass described in Example 1, Steps 1-7.

FIG. 4 shows the temperature profiles of the furnace top zone 74, the furnace bottom zone 75, and the temperature difference between the furnace top and bottom zones, or the temperature gradient 76, during the synthesis of the $As_{39}Se_{61}$ glass of Example 1, Steps 1 through 7. A negative gradient or inverse gradient is used for the first ~35 hours of the example and indicates that the temperature of the bottom zone is greater than that of the top zone. A positive gradient indicates that the temperature of the top zone is greater than that of the bottom zone and reduces the drive for convective currents in the glass melt. A positive gradient is used in this example from about hour 35 until the ampoule is removed for quenching in Step 8.

In Step 8, the hot ampoule is removed from the furnace, submerged in a room temperature (~25° C.) water bath for between 1-2 seconds to quench the glass melt into a solid glass.

Figures 5A, 5B:
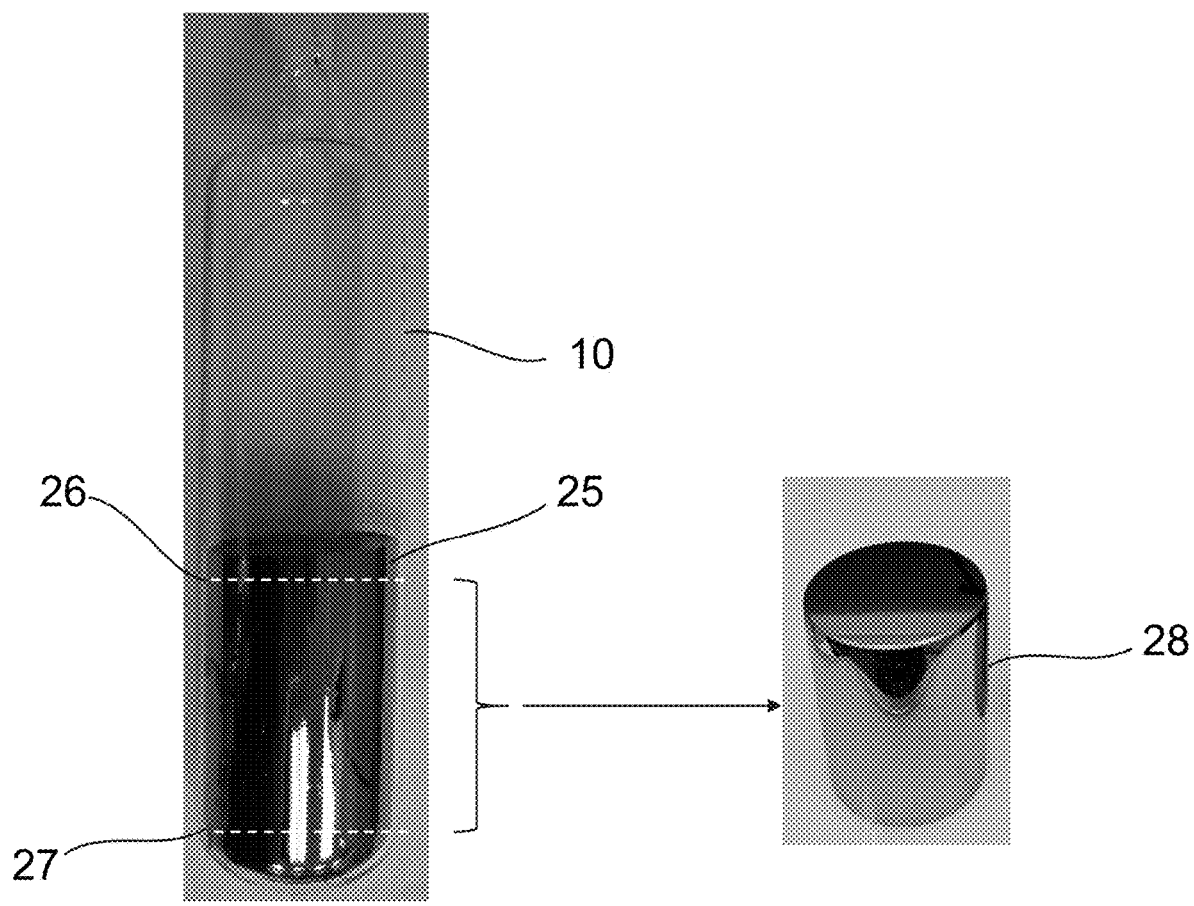
FIG. 5A shows a photograph of a sealed ampoule containing a solid $As_{39}Se_{61}$ glass ingot with no soot or glass adhered to the ampoule above the ingot. The top and bottom of the ingot were removed at the dashed lines.
FIG. 5B shows the resulting cylinder from the removal of the ingot top and bottom. The end faces of the resulting cylinder were ground and polished flat and parallel.

In Step 9, the ampoule and glass contained within are placed in a second vertically oriented cylindrical bore, tube, furnace at 165° C. for 10 hours to anneal or remove stress introduced by quenching the solid glass. After 10 hours, the furnace, ampoule, and glass are then cooled to room temperature and removed from the annealing furnace. FIG. 5A shows a photograph of the solid glass ingot 25 within the ampoule 10. Inside the sealed ampoule 10 is a homogeneous, striae-free, infrared glass ingot 25 with a composition of 39% atomic As and 61% atomic Se. The surface of the ampoule above the glass ingot is clean and free of condensed beads of glass. The glass ingot 25 was removed from the ampoule 10, and cut at the marked positions 26, 27 in FIG. 5A. As shown in FIG. 5B, the top and bottom faces of the resulting As—Se glass cylinder 28 were ground flat and parallel and subsequently polished.

Figures 6A, 6B:
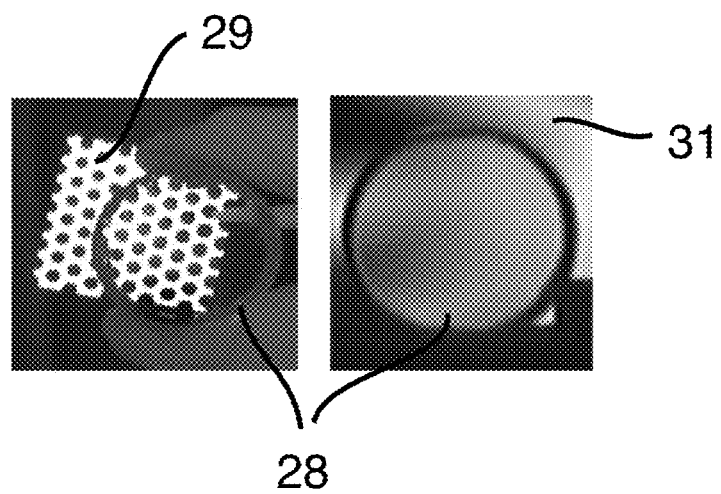
FIG. 6A shows an infrared image of a 80° C. perforated steel plate viewed through a 55 mm diameter, 110 mm thick face-polished cylinder of $As_{39}Se_{61}$ showing no striae in the glass.
FIG. 6B shows an infrared image of a human hand and fingers viewed through a 55 mm diameter, 110 mm thick face-polished cylinder of $As_{39}Se_{61}$ showing no striae in the glass.

A 110-mm tall 55-mm diameter $As_{39}Se_{61}$ glass cylinder of the present invention was inspected using an infrared camera. FIG. 6A shows an infrared photograph of a heated perforated steel plate 29 viewed through the As—Se glass cylinder with polished end faces 28. FIG. 6B shows an infrared photograph of a human hand 31 viewed through the As—Se glass cylinder with polished end faces 28, where the camera is focused on the distal surface of the glass cylinder. There are no detectable striae, inhomogeneity, or refractive index perturbations in the bulk glass.

Figure 7:
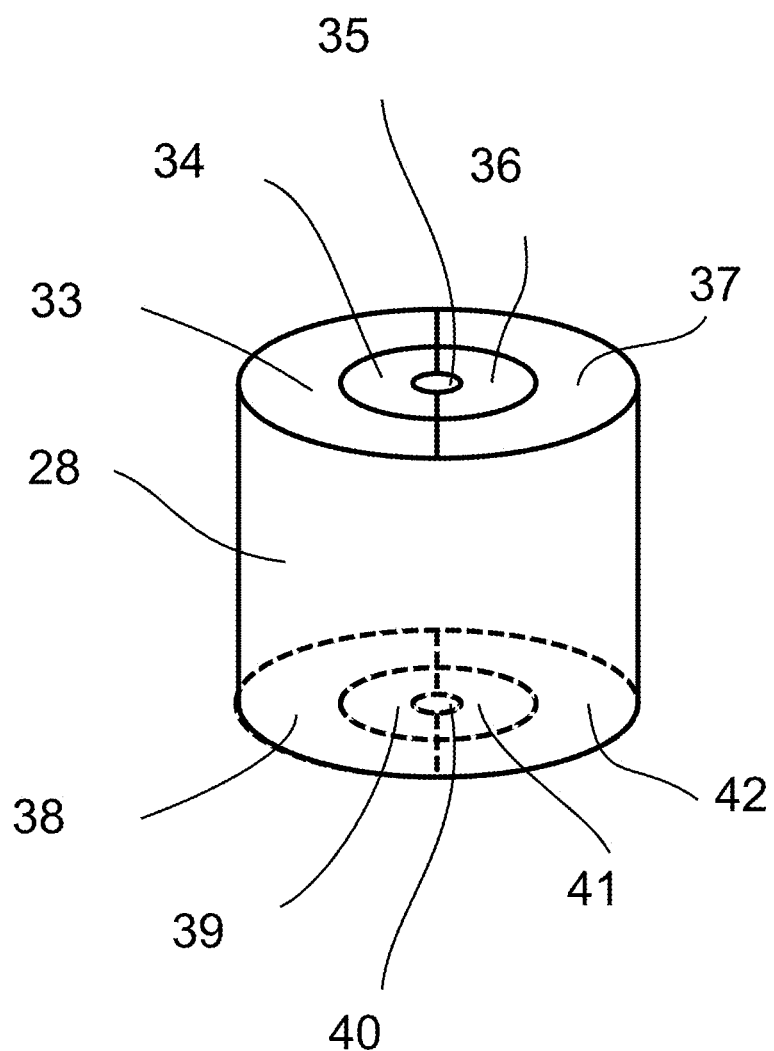
FIG. 7 is a schematic representation of an As—Se glass cylinder showing the locations where the glass transition temperature was measured.

The glass transition temperature of a 2-component glass, such as the $As_{39}Se_{61}$ glass of this example, is very sensitive to the chemical makeup of the glass such that a 1% atomic difference in composition can result in a 10° C. difference in glass transition temperature. Measurement of glass transition temperature is therefore often used as a surrogate for compositional variation in glass making. The $As_{39}Se_{61}$ glass from this example, shown schematically in FIG. 7, was cut into pieces and the glass transition temperature was measured at the 10 locations indicated in FIG. 7. Five samples were taken from the top face of the cylinder 28 including the top left edge 33, top left center 34, top dead center 35, top right center 36, and top right edge 37, and five samples were taken from the bottom face including the bottom left edge 38, bottom left center 39, bottom dead center 40, bottom right center 41 and right edge bottom 42. The glass transition temperatures measured at each location ranged from 181.0° C. to 182.1° C. The accuracy of the glass transition temperature measurement is ±0.5° C. Table 3 lists the glass transition temperatures measured in this example. The glass transition temperatures are within ±1° C., indicating a uniform and homogeneous glass without compositional variations in the bulk glass.

TABLE 3

Glass transition temperature measured along the cross section of the $As_{39}Se_{61}$ bulk glass

| Measurement location (see FIG. 7) | | Glass Transition Temperature, ° C. |
|---|---|---|
| Top Face | 33 | 181.7 |
|  | 34 | 181.5 |
|  | 35 | 181.4 |
|  | 36 | 181.2 |
|  | 37 | 181.0 |

TABLE 3-continued

Glass transition temperature measured along the cross section of the $As_{39}Se_{61}$ bulk glass

| Measurement location (see FIG. 7) | | Glass Transition Temperature, ° C. |
|---|---|---|
| Bottom Face | 38 | 182.0 |
|  | 39 | 181.5 |
|  | 40 | 181.6 |
|  | 41 | 182.1 |
|  | 42 | 181.0 |

Figure 8:
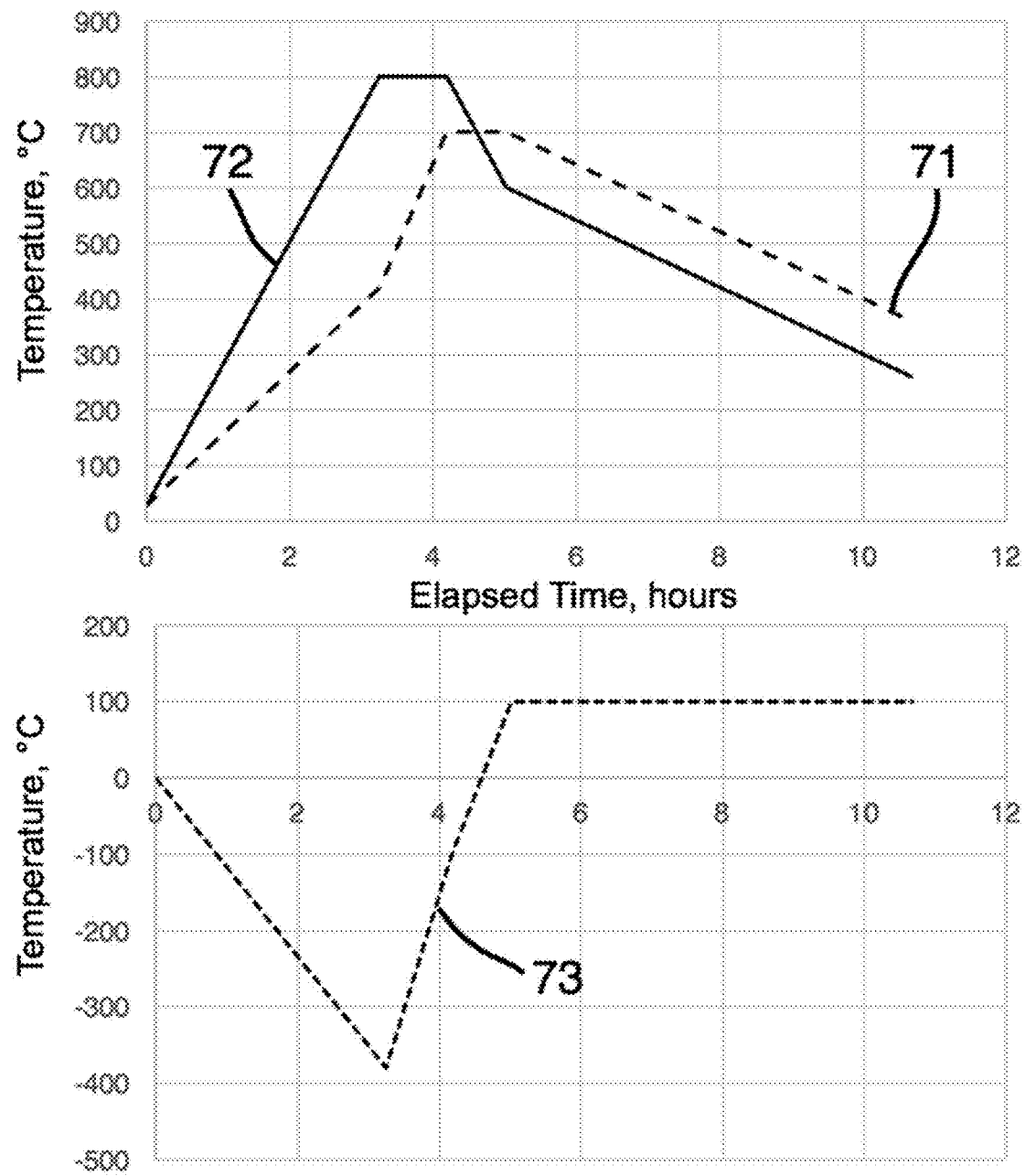
FIG. 8 shows temperature profiles of the furnace top zone, furnace bottom zone, and the temperature gradient during the synthesis of $As_{39}Se_{61}$ glass described in Example 2, Steps 1-4.

Example 2: Process of the Present Invention to Make Striae-Free and Crystallite-Free $As_{39}S_{56}Se_5$ Glass Without Mechanical Rocking or Stirring of the Glass Melt Elemental chemicals arsenic, sulfur, and selenium sufficient to make 80 g of $As_{39}S_{56}Se_5$ glass (percentages atomic basis) were placed inside an ampoule under a dry nitrogen atmosphere. The ampoule was heat sealed under vacuum using an oxygen-methane flame and placed inside a two-zone vertical tube furnace having an upper heating element and a lower heating element as shown in FIG. 2. The chemicals were melted, forming a glass melt, and cooled to form a solid glass according to the schedule in Table 4. During Step 1, when the top zone temperature was about 550° C. and the bottom zone temperature was about 800° C., a vigorous continual evaporation-reflux cycle could be observed visually and audibly. FIG. 8 shows graphically the temperature profiles of the furnace top zone 71, the furnace bottom zone 72, and the temperature difference between the furnace top and bottom zones, or the temperature gradient 73, during Steps 1 through 4 of the process in this Example. As in the previous example of the present invention, the equilibrium vapor pressures of the constituent elements, arsenic 82, sulfur 80, and selenium 81 (see FIG. 1) are lower at the top of the ampoule than in the glass melt throughout Steps 1 and 2 driving the evaporation/condensation reflux cycle that encourages rapid mixing of the melt. A negative gradient or inverse gradient is used for the first ~4.5 hours of the example and indicates that the temperature of the bottom zone is greater than that of the top zone. Vigorous evaporation/reflux cycling is observed visually and audibly in this Example when the magnitude of the inverse temperature gradient exceeds about 250° C., in other words from about hour 2 though about hour 3.5. A positive gradient indicates that the temperature of the top zone is greater than that of the bottom zone and reduces the drive for convective currents in the glass melt. A positive gradient is used in this example from about hour 4.5 until the ampoule is removed for quenching in Step 5.

TABLE 4

Glass melting schedule for $As_{39}S_{56}Se_5$ glass without mechanical agitation or stirring

| Step | Step duration (hr) | Top Zone Rate (° C./min) | Top Zone Temp. (° C.) | Bottom Zone Rate (° C./min) | Bottom Zone Temp. (° C.) | Note |
|---|---|---|---|---|---|---|
| 1 | 3.3 | +2 | 420 | +4 | 800 | Melt precursors and establish inverse temperature gradient for convection/reflux mixing. |
| 2 | 1 | +5 | 700 | 0 | 800 | Heat top zone to slow reflux |
| 3 | 1 | 0 | 700 | −5 | 600 | Cool bottom zone to establish positive temperature gradient and stop convection and evaporation/reflux cycle |

TABLE 4-continued

Glass melting schedule for $As_{39}S_{56}Se_5$ glass without mechanical agitation or stirring

| | | Top Zone | | Bottom Zone | | |
|---|---|---|---|---|---|---|
| Step | duration (hr) | Rate (° C./min) | Temp. (° C.) | Rate (° C./min) | Temp. (° C.) | Note |
| 4 | 5.6 | −1 | 360 | −1 | 260 | Slow cooling for fining |
| 5 | | | Remove ampoule from furnace and quench in 25° C. water | | | |
| 6 | 10 | | 165 | | 165 | Anneal |

The resulting glass was free of striae and transmitted infrared light.

The prior art methods to synthesize a chalcogenide glass from a melt are demonstrated here by Examples 3, 4, and 5.

Figure 9:
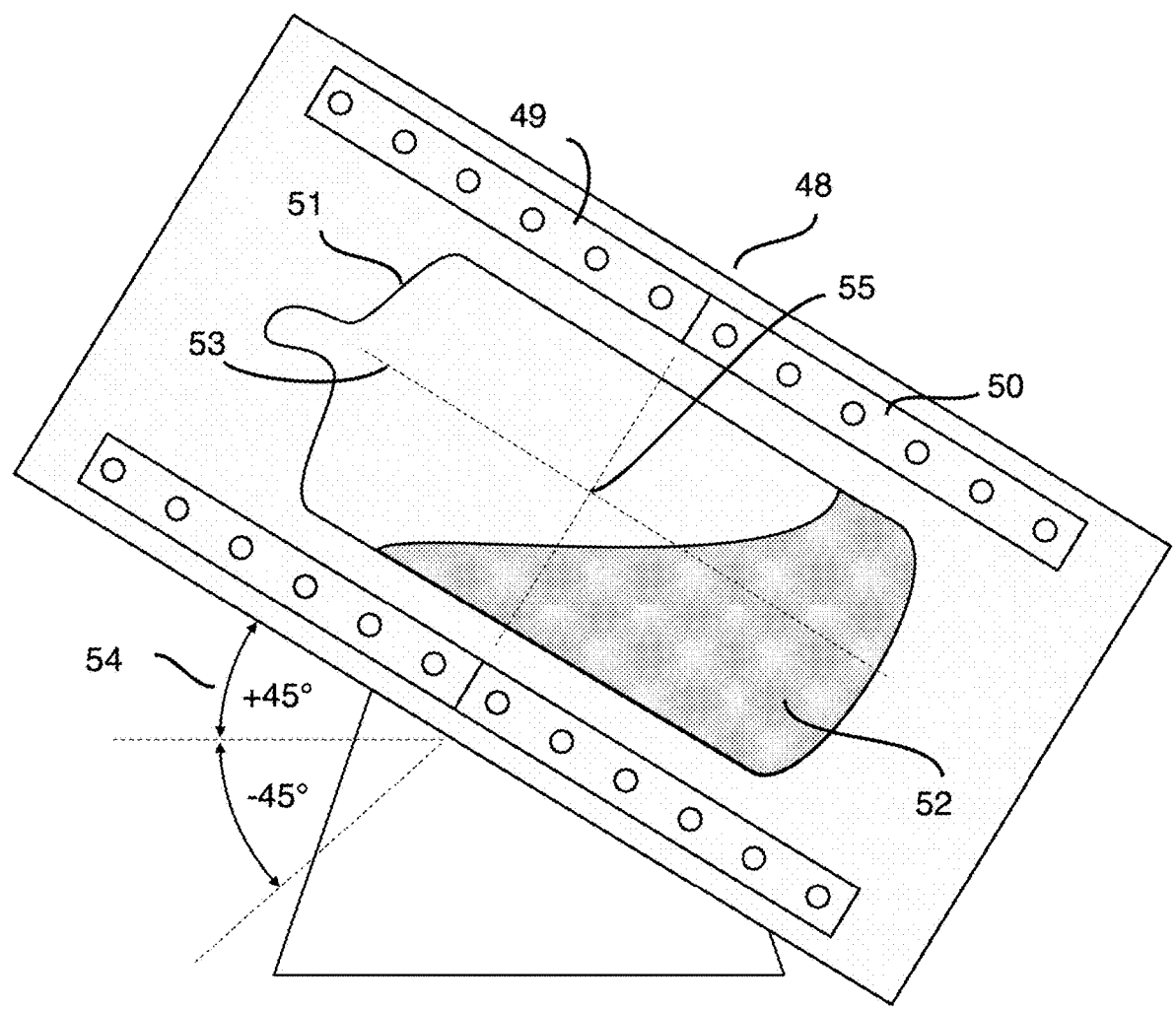
FIG. 9 is a schematic overview of the glass melting and homogenization steps used in the prior art (Examples 3, 4, and 5). A sealed ampoule containing a glass melt is inside a rocking furnace with a ±45° angle of inclination.

Example 3: Prior Art Process to Make Arsenic Sulfide-Based ($As_xS_y$) Glasses with Homogenization by Mechanical Agitation The common prior art practice for synthesis of bulk chalcogenide glasses commonly employed in the industry is demonstrated here by example and comprises five steps: 1) melting/homogenization, 2) fining, 3) cooling, 4) quenching and 5) annealing (Sanghera et al., "IR fiber optics development at the Naval Research Laboratory," SPIE, 3950, 180-185 (2000); Sanghera et al., "Applications of Chalcogenide Glass Optical Fibers at NRL," J. Optoelectronics and Advanced Materials, 3 (No. 3), 627-640 (2001); Kokorina, V. F., Glasses for Infrared Optics, CRC Press, Inc. (1996); and Sanghera et al., "Development of Low-Loss IR Transmitting Chalcogenide Glass Fibers," SPIE vol. 2396, 71-77 (1995)). FIG. 9 is a schematic overview of the glass melting and homogenization step used in the processes to synthesize infrared glasses by melt processing in the prior art (Examples 3, 4, and 5). The rocking furnace 48 comprises an upper heating element 49 and a lower heating element 50. In the prior art of Example 3, the furnace elements are not necessarily independently controlled. In the prior art of Examples 4 and 5, the furnace elements may be independently controlled, but are set to the same temperature during the homogenization step. A sealed quartz ampoule 51 with a glass melt 52 therein is positioned within the furnace 48 such that the furnace 48 and ampoule 51 share a common central axis 53. The furnace 48, the ampoule 51, and the glass melt 52 are rocked through a range of motion 54 of about ±45° with a center of rotation 55 located within the center of the furnace 48.

The melting/homogenization step of this Example 3 is shown schematically in FIG. 9. Arsenic and sulfur precursors required to make a glass with the composition of 39% atomic As and 61% atomic S were loaded in a silica ampoule 51 under an inert nitrogen gas atmosphere. The ampoule 51 was connected to a vacuum pump, evacuated, sealed, and placed inside a rocking furnace 48 with a ±45° angle of inclination 54 where it was heated and rocked according to a glass melting schedule, an example of which is shown for $As_{39}S_{61}$ glass in Table 5 (Sanghera et al., "Development of Low-Loss IR Transmitting Chalcogenide Glass Fibers," SPIE vol. 2396, 71-77 (1995)). The rocking furnace 48 may have one or more furnace elements that may or may not be controlled independently of one another. In this example, the furnace 48 is shown to have two heating elements: and upper or top element 49 and a lower or bottom element 50 corresponding to a top and bottom heating zone respectively.

The sealed silica ampoule 51 and the chemicals within were inserted into the rocking furnace 48 such that they share a common central axis 53, and the lengthwise center of the ampoule 55 corresponds to the center of rotation of the rocking furnace.

TABLE 5

Example of a prior art glass melting schedule for $As_{39}S_{61}$ glass composition in a two-zone furnace

| Step | Heating Rate (° C./min) | Temperature (° C.) Top Zone | Temperature (° C.) Bottom Zone | Dwell (Hours) | Furnace Position |
|---|---|---|---|---|---|
| 1 | 3 | 750 | 750 | 10 | Rocking at ± 45° inclination |
| 2 | — | 750 | 750 | 1 | Vertical 90° fixed |
| 3 | −5 | 440 | 440 | 2 | Vertical 90° fixed |
| 4 | Remove ampoule from furnace and quench in 25° C. water | | | | |
| 5 | | 180 | 180 | 10 | Annealing furnace |

In Step 1, as shown schematically in FIG. 9 and detailed in Table 5, the top zone and bottom zone of the furnace were controlled together, as is commonly done in the prior art, and heated at a rate of 3° C./min from 20° C. (room temperature) to 750° C. at which point the rocking action of the furnace was started. The furnace then remained at 750° C. for 10 hours and was actively rocked at an inclination angle of ±45° to facilitate mixing and homogenization of the glass melt 52.

Figure 10:
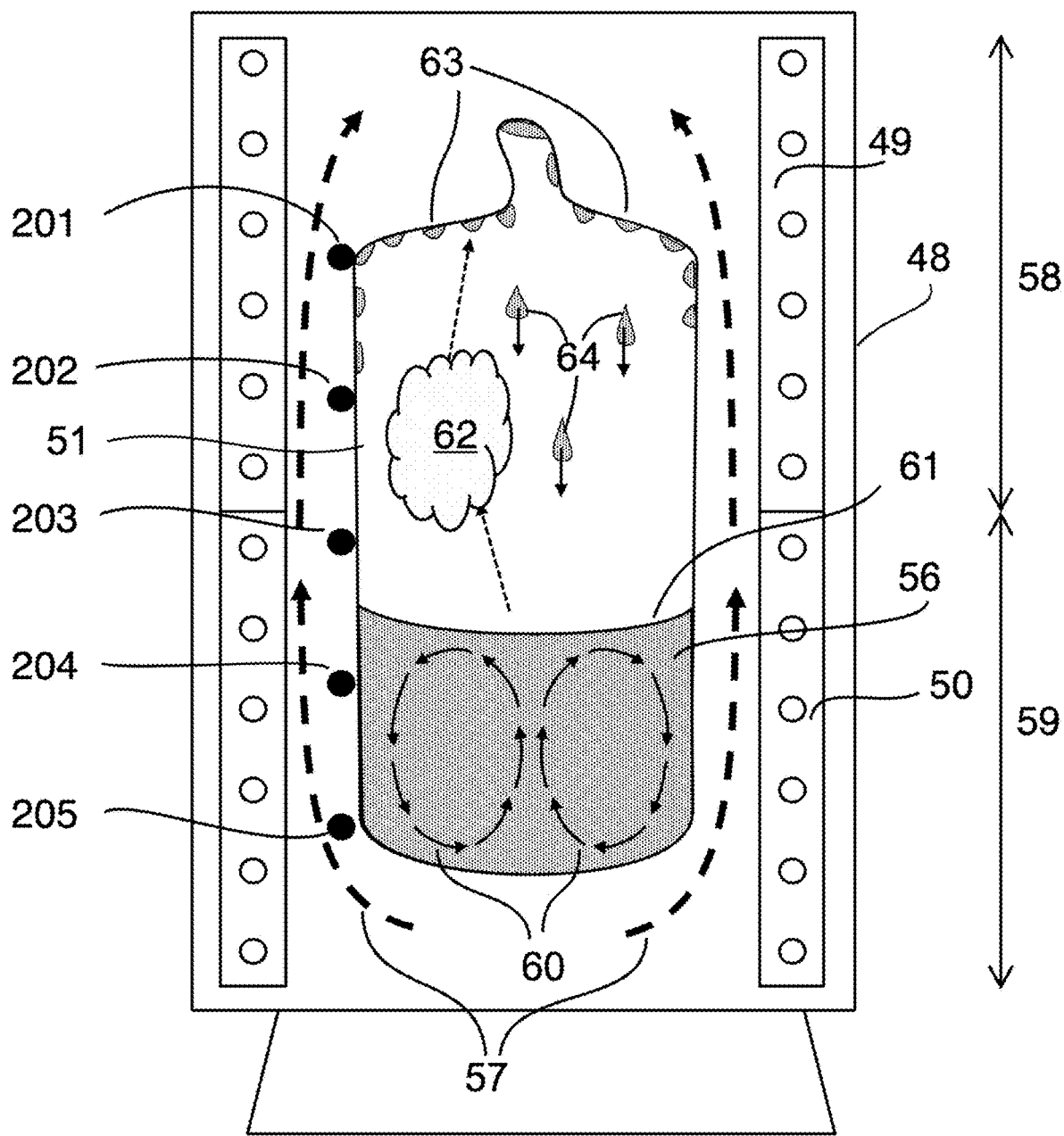
FIG. 10 is a schematic diagram of the glass fining and cooling steps of the prior art described in Example 3. A sealed ampoule containing a glass melt is inside a rocking furnace in a vertical position. Thermal gradients within the furnace cause thermal convection currents in the glass melt, and evaporation and condensation that drip back into the melt cause striae.

In Step 2, the fining step, the furnace motion was stopped and the furnace was set to a vertical position (90° fixed angle), as shown schematically in FIG. 10, and held at temperature (750° C.) for 1 hour to facilitate fining and settling of the glass melt. It is in this step that any bubbles introduced by rocking migrate to the surface.

FIG. 10 is a schematic overview of the glass fining and cooling steps of the process to synthesize infrared glasses by melt processing in the prior art. The sealed quartz ampoule 51 containing a well-mixed, homogenized glass melt 56 is inside a rocking furnace 48 that is in a vertical position. The rocking furnace 48 comprises one or more heating elements 49, 50 that, in this case, are controlled only as a group and are set to the same temperature or are set to a temperature difference of less than about 50° C. Convective heat loss within the furnace 57 ensures that the upper portion of the furnace 58 is cooler than the lower portion 59 and imparts a temperature gradient. Additionally, during cooling, the glass melt at the bottom of the ampoule retains heat and cools more slowly than the portion of the ampoule above the melt, resulting in a cooling lag that contributes to the temperature gradient. The temperature gradient was measured using thermocouples affixed to the ampoule 51 at five positions 201, 202, 203, 204, 205 during the process. During the fining step, this temperature gradient imparts convective currents 60 within the glass melt 56 which has a low viscosity. Chemical elements leave the upper surface 61 of the glass melt, and enter the vapor phase 62 above the glass melt. During the cooling step of the process, the top portion of the silica ampoule, with a low thermal mass, cools faster than the bottom portion of the silica ampoule that is in contact with the glass melt 56, which has a high thermal mass, and as such, liquid droplets 63 containing the glass constituents condense on the upper portion of the silica ampoule 51. These droplets have a different composition than the overall glass melt and may fall 64 back into the glass melt. This condensation occurs through the duration of the cooling step while the viscosity of the glass melt gradually increases. The droplets that fall later in the process are less likely to be completely reincorporated back into the glass melt resulting in striae and other inhomogeneity in the final glass.

In Step 3, the cooling step, the temperatures of both the top and bottom zones were reduced at a rate of 5° C./min to 440° C. and the temperature was held at 440° C. for 2 hours while monitoring the temperature profile of the ampoule at five locations along its length 201, 202, 203, 204, 205) as indicated in FIG. 10. The temperature profile measurement, shown in Table 6, indicates an inverse temperature gradient, where the bottom is hotter than the top, of −12° C., in spite of the two furnace zones being set to the same temperature.

TABLE 6

Ampoule temperature profile during the cooling step, Step 3

| Measurement point (See FIG. 10) | Temperature |
|---|---|
| 201 | 430° C. |
| 202 | 435° C. |
| 203 | 438° C. |
| 204 | 441° C. |
| 205 | 442° C. |

In Step 4, the quench step, the hot ampoule and the glass melt contained therein were removed from the furnace and submerged in a room temperature (about 25° C.) water bath for 30 seconds to rapidly cool the melt forming a solid glass.

In Step 5, the annealing step, the ampoule and the solid glass ingot contained therein were then placed in another furnace at 180° C. for 10 hours to remove residual stress introduced by the rapid cooling in Step 4 from the solid glass.

Figure 11:
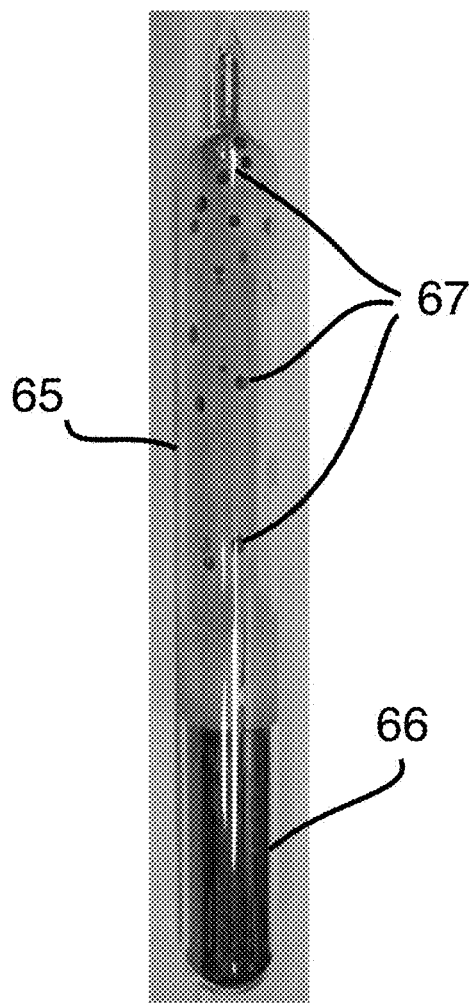
FIG. 11 is a photograph of a sealed ampoule containing a solid ingot of $As_{39}S_{61}$ glass of the prior art described in Example 3 with solid glass droplets adhered to the ampoule.
Figure 12:
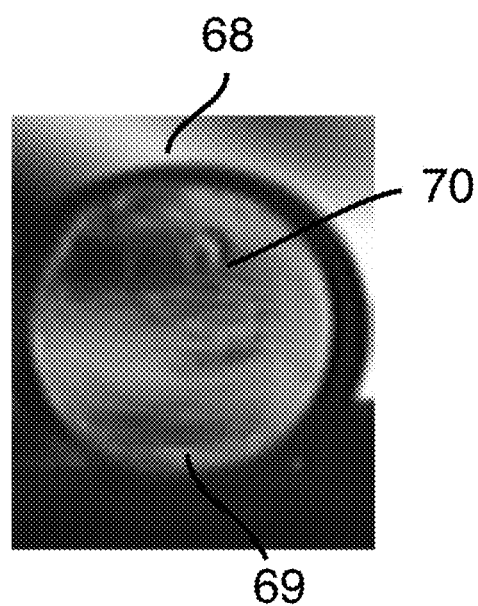
FIG. 12 is an infrared photograph of a human hand and fingers viewed through an $As_{39}S_{61}$ glass of the prior art described in Example 3 showing striae within the glass.

FIG. 11 shows a photograph of the solid glass ingot 66 within the sealed silica quartz ampoule 65. The surface of the ampoule above the glass ingot has condensed beads of glass 67 and soot adhered to it. The glass ingot was removed from the ampoule, and the top and bottom portions of the ingot were removed using a diamond saw and the end faces of the resulting $As_{39}S_{61}$ glass cylinder were ground flat and polished. The glass was inspected using an infrared camera. FIG. 12 shows an infrared image of a human hand and fingers 68 viewed through the 65 mm thick glass cylinder 69 and reveals significant striae and optical inhomogeneity 70.

The origin of the striae in the glass of this prior art example can be attributed to the inverse temperature gradient apparent in the fining and cooling steps, steps 2 and 3. In Step 3 of this example, although the top and bottom zones of the furnace are both set at the same temperature, 440° C., the actual measured temperature along the length of the ampoule containing the glass melt varies due to 1) convective heat loss within the furnace and 2) the cooling lag resulting from the larger thermal mass of the glass melt in the bottom of the ampoule compared to the rapidly cooling portion of the ampoule above the glass melt. A temperature gradient (ΔT) of 12° C. has been measured in the example as detailed in Table 6. This gradient causes thermal convection currents 60 within the glass melt 56 when the temperature is high and the glass melt viscosity is low (FIG. 10).

At elevated temperatures, the vapor pressures of arsenic and sulfur are high and both elements are present as gasses 62 in the atmosphere above the glass melt within the sealed ampoule (FIG. 10). During cooling, the equilibrium vapor pressures for both elements decrease and droplets of liquid As—S 63 condense on the cooler upper portion of the ampoule. However the glass melt, as it cools, is still hotter than the top of the ampoule, material may continue to evaporate from its surface 61 continuing the evaporation/condensation cycle. These glass droplets may then drip back into the melt 56. The condensation droplets 64 may have a different composition than the rest of the glass melt, and this continual mass fluxing cycle can cause a compositional non-uniformity throughout the entire melt as thermal convection currents 60 distribute them deeper into the glass melt. As the glass cools further during Step 3, the composition of the glass near the surface is changing as condensation of gaseous components (e.g. sulfur) from the closed system settle on the surface of the glass melt forming a depletion layer. Thermal convection currents within the glass allow this depletion layer, with a slightly different composition, to become somewhat reincorporated into the bulk glass. The convection currents are not sufficient to thoroughly distribute or homogenize the glass, resulting in compositional gradients within the glass. During water quenching of Step 4, it took between 26-30 seconds to quench the glass. The viscosity of the glass increased rapidly as the glass melt cooled and the compositional gradients became frozen resulting in striae in the bulk glass. The viscosity of the glass during the annealing step, Step 5, is too high to allow any removal of compositional non-uniformity. Consequently, there are refractive index perturbations in the striae-containing glass that degrade the quality of the glass and resulting optics and optical fiber made from the glass of this prior art example.

Example 4: Prior Art Process to Make Striae-Free Arsenic Sulfide ($As_xS_y$) Glass Compositions in a Two-Zone Furnace with Homogenization by Mechanical Agitation Nguyen et al. in a prior art invention teach a method to synthesize striae-free arsenic sulfide-based chalcogenide glass ($As_{39}S_{61}$) and other chalcogenide glasses (Nguyen et al., "Striae-Free Chalcogenide Glasses," U.S. Pat. No. 9,708,210 (Jul. 18, 2017)). Their invention comprises six steps as detailed in Table 7, and uses a two-zone rocking furnace 48 as shown schematically in FIGS. 9 and 13, with an upper zone 58 and a lower zone 59. The key feature of this prior art method is the establishment of a controlled temperature gradient within the furnace, in order to suppress the convection currents within the glass melt and the evaporation-condensation cycle that introduces striae. Specifically, in this example for synthesis of $As_{39}S_{61}$ glass the temperature of the upper zone is hotter than the lower zone by 100° C. during steps 1-4 of the melting schedule shown here in Table 7 (Nguyen et al., "Striae-Free Chalcogenide Glasses," U.S. Pat. No. 9,708,210 (Jul. 18, 2017)). The temperature gradient along the length of the ampoule 51 was measured at five locations 201, 202, 203, 204, 206 and is shown in Table 8. This positive temperature gradient eliminates the main causes of striae and therefore reduces compositional variations in the molten glass but requires mechanical agitation of the glass melt, by means of an oscillatory rocking furnace in this example.

TABLE 7

Example of a prior art glass melting schedule for striae-free $As_{39}S_{61}$ glass in a two-zone furnace

| Step | Heating Rate (° C./min) | Temperature (° C.) Top Zone | Temperature (° C.) Bottom Zone | Dwell (Hours) | Furnace Position |
|---|---|---|---|---|---|
| 1 | 3 | 850 | 750 | 1 | Horizontal 0° fixed |
| 2 | — | 850 | 750 | 10 | Rocking at ± 45° inclination |
| 3 | −1 | 800 | 700 | 24 | Vertical 90° fixed |
| 4 | −0.6 | 360 | 260 | 12 | Vertical 90° fixed |
| 5 | Remove ampoule from furnace and quench in 25° C. water | | | | |
| 6 | | 180 | 180 | 10 | Annealing furnace |

TABLE 8

Ampoule temperature profile during the cooling step, Step 4

| Measurement point (See FIG. 13) | Temperature |
|---|---|
| 201 | 361° C. |
| 202 | 360° C. |
| 203 | 262° C. |
| 204 | 261° C. |
| 206 | 260° C. |

Example 5: Prior Art Process of Glass Melting to Make $Ge_xAs_ySe_zTe_{(100-x-y-z)}$ Glass in a Two-Zone Furnace with Homogenization by Mechanical Agitation Nguyen et al. in another prior art invention teach a method to synthesize striae-free and crystallite-free $Ge_xAs_yS_{(100-x-y-z)}Se_z$ glasses (Nguyen et al., "Manufacturing Process for Striae-Free Multicomponent Chalcogenide Glasses via Multiple Fining Steps," U.S. patent Ser. No. 10/131,568 (Nov. 20, 2018)). Their invention builds upon the prior art in Example 4, comprises nine steps as detailed in Table 9, and uses, a two-zone rocking furnace 48 as shown schematically in FIGS. 9 and 13, with an upper zone 58 and a lower zone 59.

Figure 13:
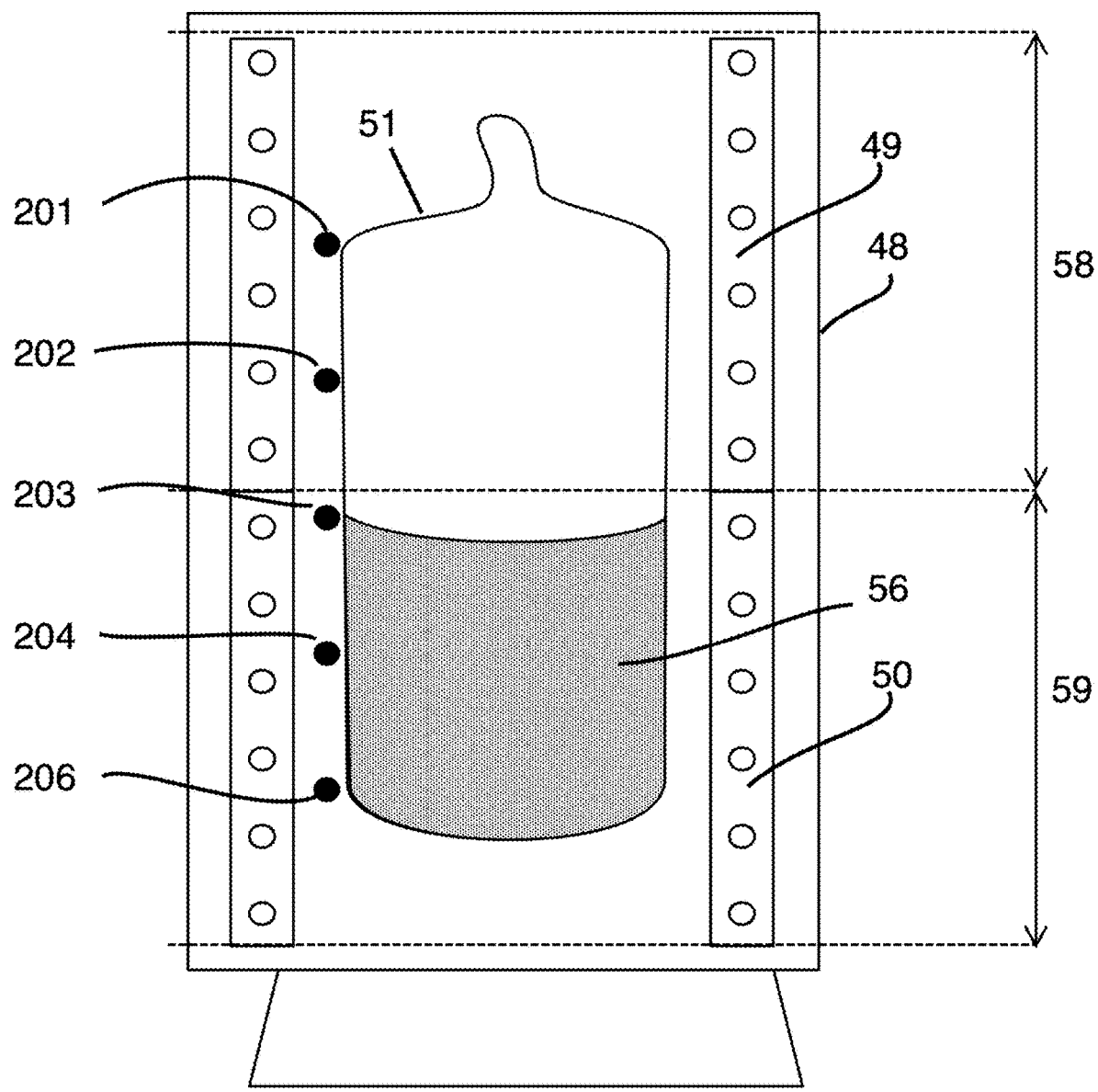
FIG. 13 is a schematic overview of the glass fining and cooling steps of the prior art described in Examples 4 and 5. A sealed ampoule and the glass melt contained therein is inside a rocking furnace positioned vertically. The temperature profile is measured by thermocouples positioned along the length of the ampoule.

FIG. 13 is a schematic overview of the glass fining and cooling steps of the process to synthesize infrared glasses by melt processing. The sealed quartz ampoule 51 containing a well-mixed, homogenized glass melt 56 is inside a rocking furnace 48 that is in a vertical position. The rocking furnace 48 comprises an upper or top heating element 49 and a lower or bottom heating element 50 that are independently controlled, and in these prior art examples are set to different temperatures during the glass fining and cooling steps such that the temperature of the upper or top zone 58 is about 100° hotter than the lower or bottom zone 59. The temperature gradient was measured using thermocouples affixed to the ampoule 51 at five positions 201, 202, 203, 204, 206 during the process. During the fining step, this temperature gradient prevents convective currents within the glass melt 56.

During fining and cooling of the glass melt, steps 3-7, the temperature of the upper zone is hotter than the lower zone by 100° C. This method also provides multiple cooling steps, steps 5-7, with rapid cooling rates between them. Rapid cooling between these steps prevents formation of crystallites by cooling quickly through the temperatures where crystals nucleate. The temperature profile of the cooling is shown in Table 10. These features provide for high optical quality glasses by reducing striae and preventing formation of crystallites during cooling. This prior art however requires mechanical agitation of the glass melt, by means of an oscillatory rocking furnace in this example.

TABLE 9

Example of a prior art glass melting schedule for $Ge_xAs_yS_{(100-x-y-z)}Se_z$ glass compositions in a two-zone furnace

| Step | Heating Rate (° C./min) | Temperature (° C.) Top Zone | Temperature (° C.) Bottom Zone | Dwell (Hours) | Furnace Position |
|---|---|---|---|---|---|
| 1 | 3 | 680 | 680 | 1 | Horizontal 0° fixed |
| 2 | — | 680 | 680 | 15 | Rocking at ±45° inclination |
| 3 | +0.6(T), −0.6(B) | 750 | 650 | 1 | Rocking at ±45° inclination |
| 4 | — | 750 | 650 | 3 | Vertical 90° fixed. Fining. |
| 5 | −10.0 | 650 | 550 | 3 | Vertical 90° fixed. Cooling. |
| 6 | −10.0 | 550 | 450 | 3 | Vertical 90° fixed. Cooling. |
| 7 | −10.0 | 450 | 350 | 0.5 | Vertical 90° fixed. Cooling |
| 8 | Remove ampoule from furnace and quench in 25° C. water | | | | |
| 9 | | 195 | 195 | 10 | Annealing furnace |

TABLE 10

Ampoule temperature profile at the end of the cooling step, Step 7

| Measurement point (See FIG. 13) | Temperature |
|---|---|
| 201 | 451° C. |
| 202 | 450° C. |
| 203 | 352° C. |
| 204 | 351° C. |
| 205 | 350° C. |

Figures 14A, 14B:
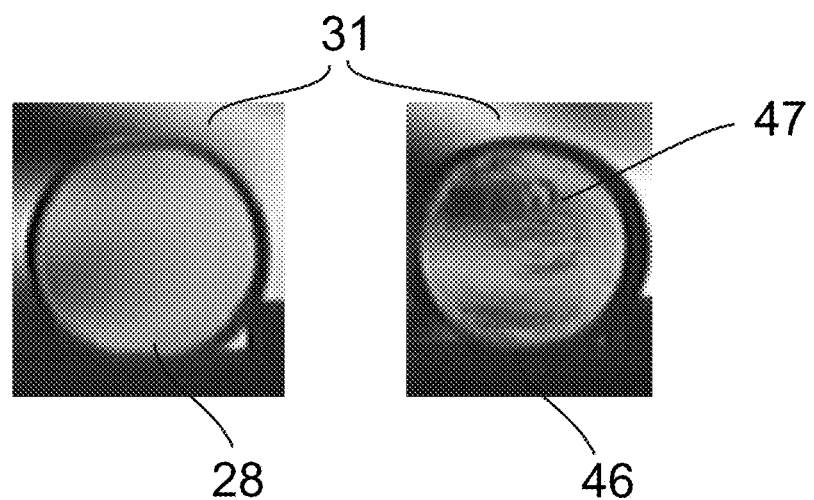
FIGS. 14A and 14B are infrared photographs comparing the clarity of $As_{39}Se_{61}$ glass of the present invention with that of the prior art.

FIGS. 14A and 14B are infrared photographs comparing the clarity of $As_{39}Se_{61}$ glass of the present invention with that of the prior art. FIG. 14A shows a human hand 31 viewed through a 55 mm thick As—Se glass cylinder with polished end faces 28 of the present invention where the camera is focused on the distal surface of the glass cylinder showing no striae or optical inhomogeneity within the glass. FIG. 14B shows a human hand 31 viewed through a 55 mm thick As—S glass cylinder with polished end faces 46 of the prior art as detailed in Example 3 where the camera is focused on the distal surface of the glass cylinder revealing significant striae or optical inhomogeneity 47.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for making a striae-free chalcogenide glass, comprising:
   loading chalcogenide glass precursors into an ampoule, sealing the ampoule, and placing the ampoule in a furnace, wherein said furnace has an upper furnace element corresponding to a top zone and a lower furnace element corresponding to a bottom zone, and wherein the furnace is fixed without undergoing any rocking or external mechanical agitation;
   heating the ampoule to form a glass melt from the chalcogenide glass precursors, wherein said heating creates a negative temperature gradient between the top zone and the bottom zone, wherein the bottom zone has a higher temperature than the top zone, and wherein said temperature gradient creates convection currents in said glass melt;
   reversing said negative temperature gradient and creating a positive temperature gradient between said top zone and said bottom zone by adjusting said upper furnace element to heat said top zone and adjusting said lower furnace element to cool said bottom zone, wherein said bottom heat zone has a lower temperature than said top heat zone;
   cooling said glass melt while maintaining said positive temperature gradient, wherein during said cooling there are holds at multiple temperatures;
   removing said ampoule from said furnace and water quenching said glass melt.

2. The method of claim 1, wherein the chalcogenide glass precursors comprise arsenic, sulfur, and selenium, tellurium, germanium, or any combination thereof.

3. The method of claim 1, wherein when creating said negative temperature gradient, the top zone is heated to between 420 and 450° C. and the bottom zone is heated to 800° C.

4. The method of claim 1, wherein when creating said positive temperature gradient, the top zone is heated to between 700 and 750° C. and the bottom zone is cooled to between 600 and 650° C.

5. The method of claim 1, wherein said negative temperature gradient is between 350 and 380° C.

6. The method of claim 1, wherein said positive temperature gradient is 100° C.

* * * * *